(No Model.)

A. F. AHLUM.
SIEVE OR SIFTER.

No. 423,019. Patented Mar. 11, 1890.

WITNESSES:
E. L. Sherman
Alfred Gartner

INVENTOR:
Alvin F. Ahlum,
BY Drake & Co. ATTY'S.

N. PETERS, Photo-Lithographer, Washington, D. C.

UNITED STATES PATENT OFFICE.

ALVIN F. AHLUM, OF MEMPHIS, TENNESSEE.

SIEVE OR SIFTER.

SPECIFICATION forming part of Letters Patent No. 423,019, dated March 11, 1890.

Application filed March 13, 1889. Serial No. 303,117. (No model.)

*To all whom it may concern:*

Be it known that I, ALVIN F. AHLUM, a citizen of the United States, residing at Memphis, in the county of Shelby and State of Tennessee, have invented certain new and useful Improvements in Sieves and Sifters; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to avoid the crevices and recesses in rim sieves or sifters as ordinarily constructed, in which flour or other substances collect and lodge, and produce at a reduced cost of manufacture a sieve of great strength and durability.

The invention consists in the improved sieve herein described and the combination and arrangements of parts thereof, as will be hereinafter more fully set forth, and finally embodied in the clauses of the claim.

Figure 3:
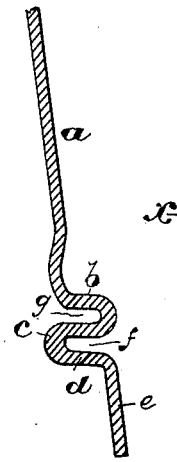
Figure 2:
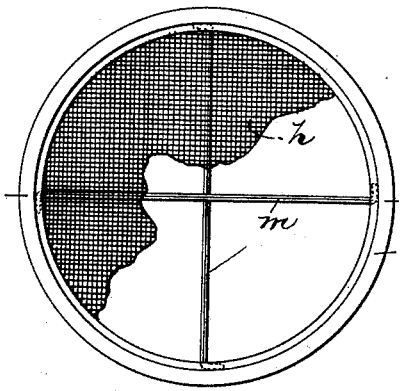
Figure 4:
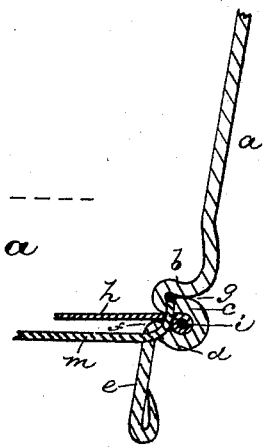
Figure 1:
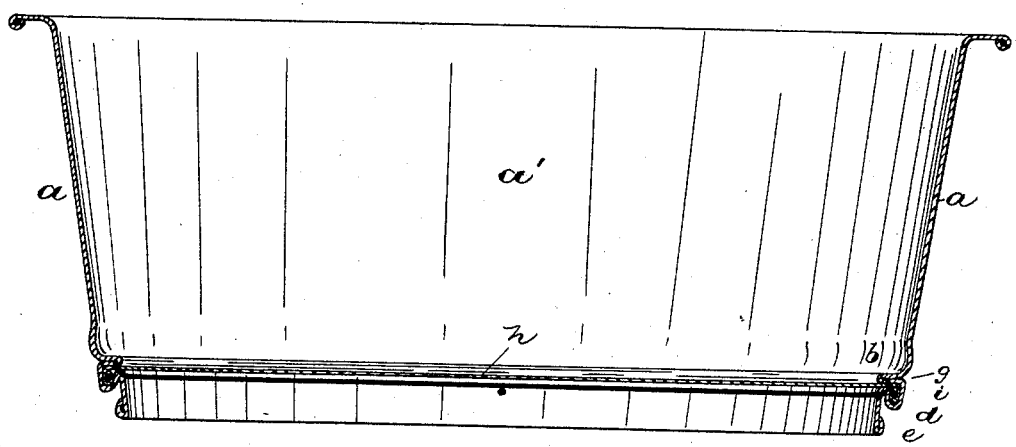

Referring to the accompanying drawings, in which like letters of reference indicate corresponding parts in each of the several figures, Figure 1 is a central vertical section of a sieve embodying my improvements. Fig. 2 is a view from underneath, showing the wire-cloth and cross-wires in position. Fig. 3 is a vertical section of the shell or body before the wire-cloth and cross-wires are inserted, and Fig. 4 is a vertical section showing the various parts pressed into their proper position.

In said drawings, $a$ represents the body and foot of the sieve, made of one piece of tin or any desired sheet metal. This body is preferably bent or formed into the shape shown in Fig. 3 by turning the metallic sheet inward upon nearly a right angle, as shown at $b$; then down and outward in or near a line parallel with $b$, as shown at $c$; then downward and inward, as shown at $d$, and then downward at nearly a right angle with $d$, forming the bottom rim or flange $e$ of the sieve. By thus bending and forming the body an inward recess $f$ and outward recess $g$ are formed, as shown. Within the recess $f$ is placed a wire sieve-cloth $h$, re-enforced by a wire $i$ around its outer edge, as hereinafter set forth.

Across the sieve and under the wire-cloth are stretched or drawn cross-wires $m\ m$. Said wires $m$, when in final position in the sieve, after extending transversely beneath the cloth, extend at their extremities through perforations in the corrugated portions of the body, passing upward in front of the peripheral re-enforcing wire $i$ into the outer recess $g$, where it is laterally bent to lie in said outer recess, so that when the latter is closed by downward pressure on the walls thereof the said laterally-bent portion will lie concealed from view and be held in place with great firmness and security. The upward extensions of the wire $m$ lie within or on the inner side of the peripheral wire, crossing the same to hold or lock the same in place, as will be manifest.

In further carrying out my invention the pan or body of the sieve is first formed substantially in the form shown in Fig. 3. The sieve or wire cloth is then cut a little larger in diameter than that of the body of the sieve at the recess $f$, and its outer edges are turned over, so as to receive and hold the re-enforcing peripheral wire ring $i$. This cloth, with its wire ring, is then inserted in the recess $f$. The ends of the cross-wires are then passed through openings in the body and passed around so as to bear against the body of the sieve, as shown in dotted lines in Fig. 2. The sieve is then placed in a suitable machine and the parts $b$ and $c$ are pressed firmly together, thus closing the recess $f$, and finally locking and securing thereon the sieve-cloth with its wire ring. The ends of the cross-wires are also pressed by this operation into the recess and drawn out of sight and secured firmly in such manner that soldering is unnecessary, thereby making a great saving in time and labor. This operation, in addition to firmly locking and securing the parts together, also draws both the sieve-cloth and cross-wires much tighter across the bottom of the sieve, thereby making it firmer than sieves of ordinary construction.

When constructed in the manner herein shown there will be no recesses or crevices in which flour or other substance can collect and lodge.

Having thus described my invention, what I claim as new, and desire to secure by Letters Patent, is—

1. The improved sieve combining with the body having the outward recess g, formed by corrugating the said body, a wire-cloth and a transverse supporting-wire m, extending beneath said cloth and at its opposite ends through perforations in said body, the said ends being bent to lie in said recess concealed from sight, substantially as set forth.

2. The improved sieve combining with the corrugated body having an inward and outward recess, as described, a wire-cloth and its peripheral supporting-wire and a transverse supporting-wire, the said transverse and peripheral wires being locked within the closed recesses, substantially as set forth.

3. The improved sieve herein described, having a perforated body with the inward recess f, a cloth having a peripheral wire i, arranged in said recess, and a transverse wire having its ends bent to extend through the perforations in said body across the inner side of said peripheral wire to tie or lock the same in place, substantially as set forth.

In testimony that I claim the foregoing I have hereunto set my hand this 8th day of March, 1889.

ALVIN F. AHLUM.

Witnesses:
 CHARLES H. PELL,
 R. J. BLACK.